Nov. 12, 1929.   H. L. WHITNEY ET AL   1,735,226
ENSILAGE AND FEED CUTTING MACHINE
Filed Oct. 11, 1926    5 Sheets-Sheet 2
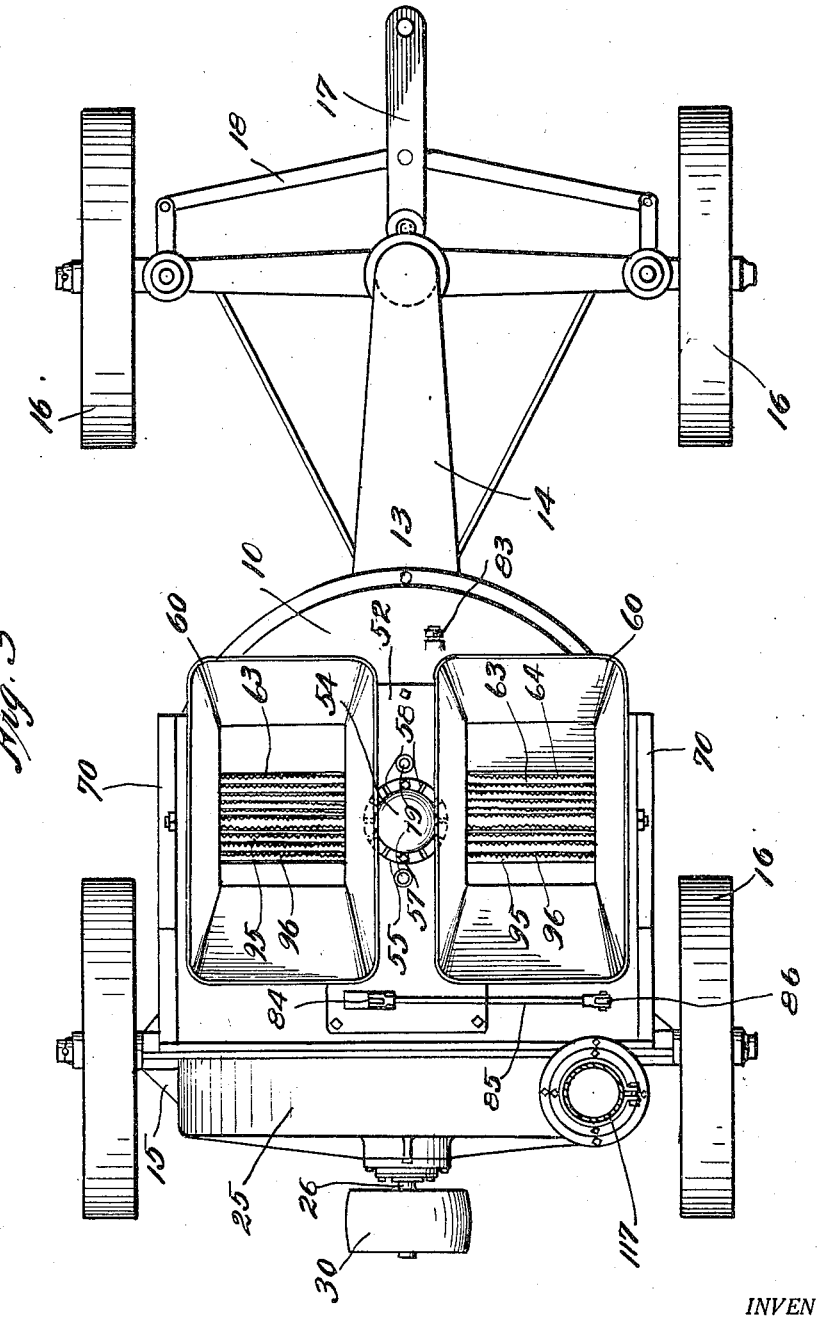
INVENTORS.
H. L. Whitney and
H. A. Lyon,
BY Thorpe & Gerard,
ATTORNEYS.
Witness:
R. E. Hamilton

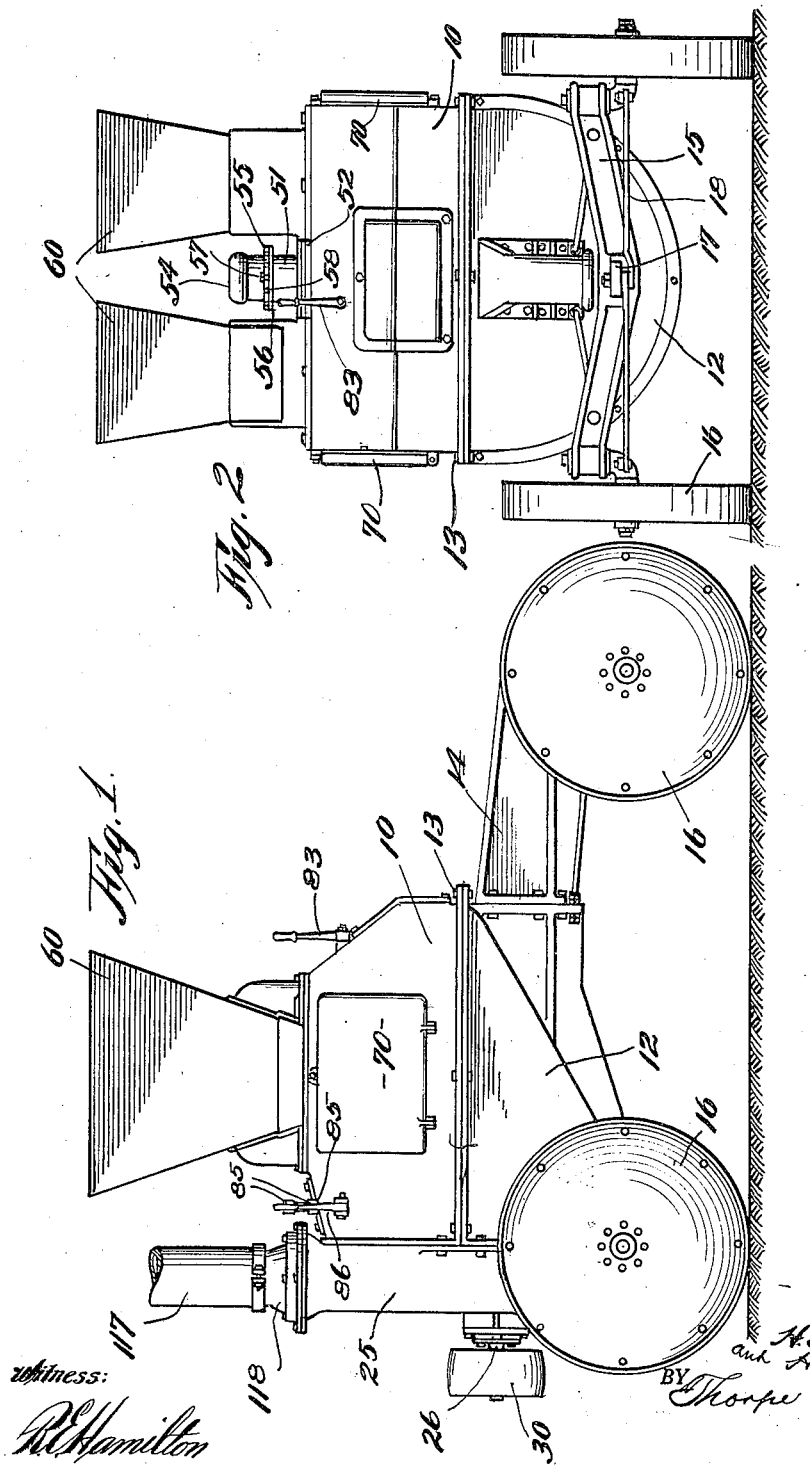

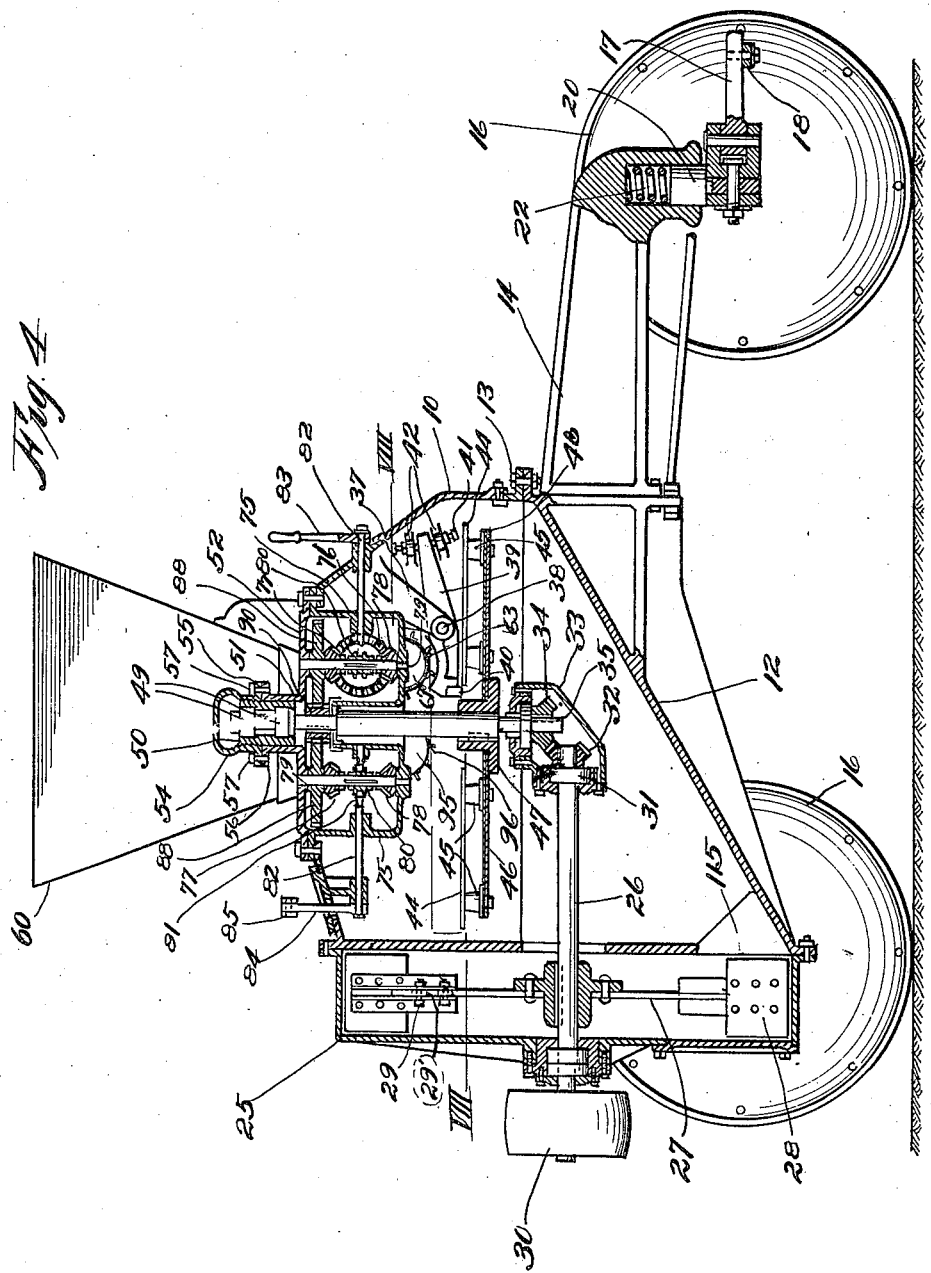

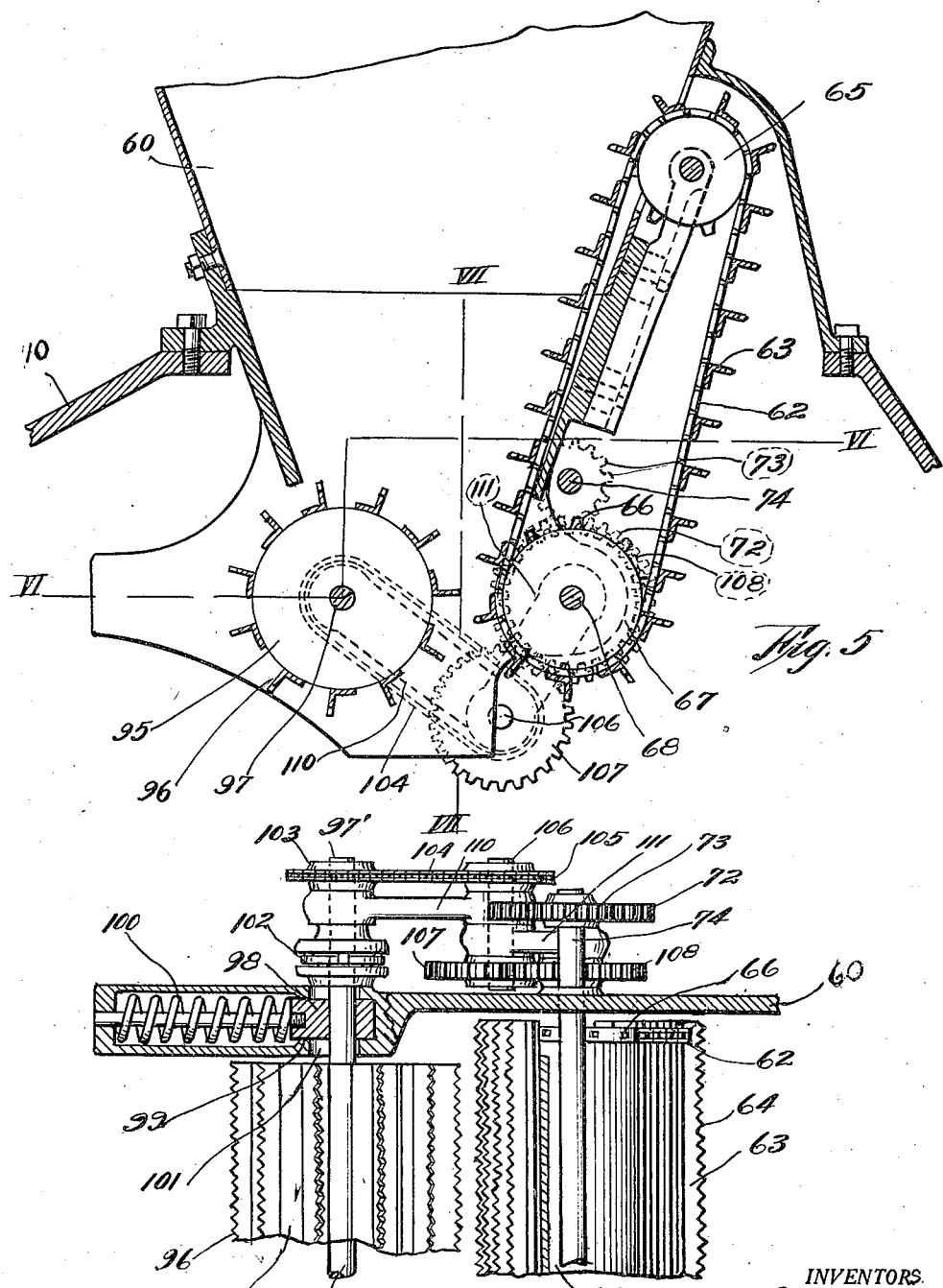

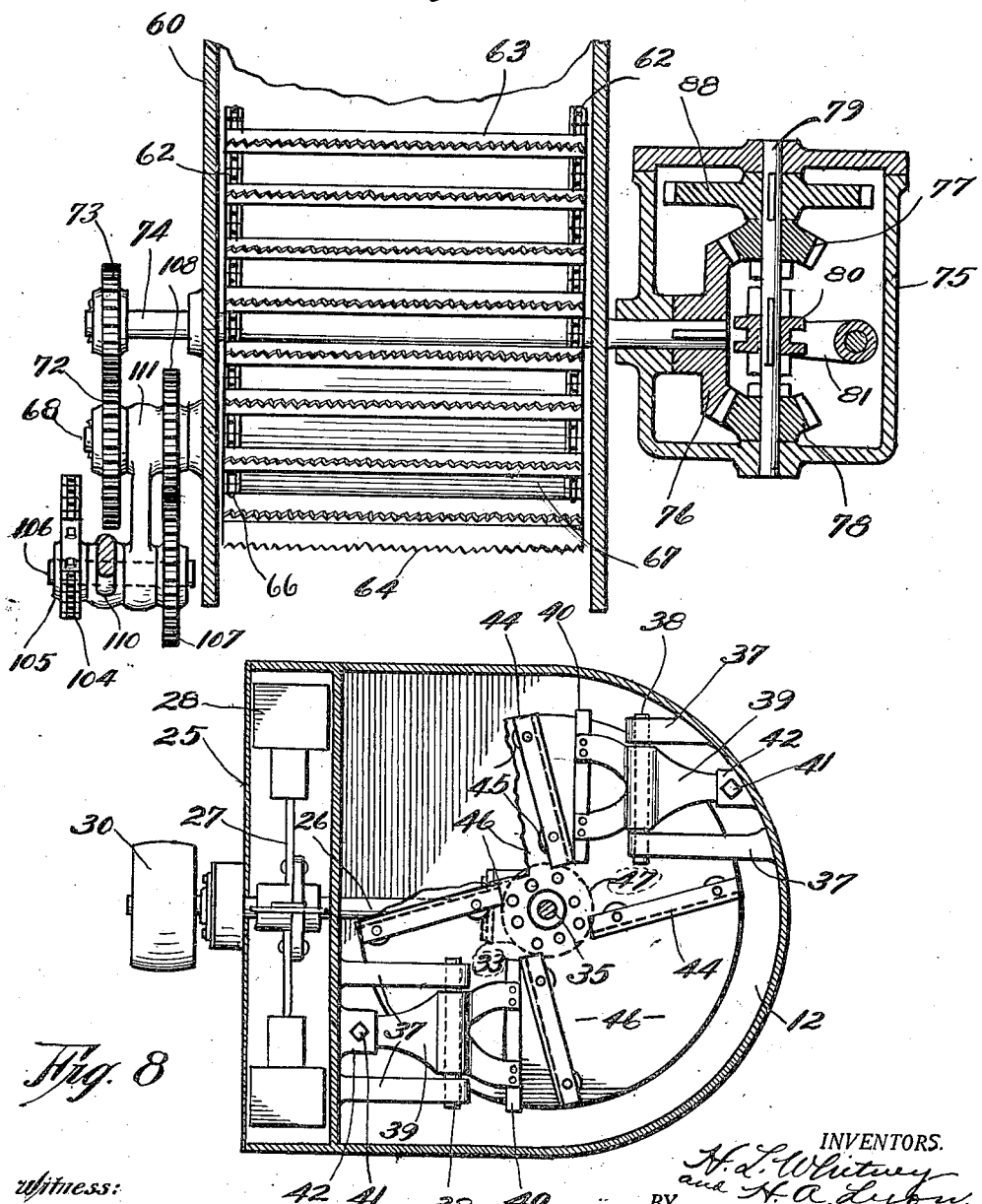

Patented Nov. 12, 1929

1,735,226

UNITED STATES PATENT OFFICE

HARRY L. WHITNEY AND HARRY A. LYON, OF TOLEDO, OHIO

ENSILAGE AND FEED CUTTING MACHINE

Application filed October 11, 1926. Serial No. 140,801.

The present invention relates to machines for cutting feed, fodder, ensilage or the like, and aims to provide an improved and more efficient arrangement and construction of cutting mechanism, together with an improved type of feeding means for conveying the material to the cutting mechanism.

Accordingly, one of our objects is to provide a machine in which the cutting mechanism includes cutters carried by a vertical shaft and co-operating with fixed cutter bars, to which cutting mechanism the material is fed from upright hoppers mounted over the cutting mechanism, to the end that gravity will assist in the feeding of the material from the hoppers.

It is also an object of the invention to provide a machine embodying more than one such upright hopper so arranged that the hoppers may be operated either simultaneously or singly or independently. It is moreover sought to devise a hopper construction which includes feeding mechanism adapted to reinforce the action of gravity in feeding the material to the cutting mechanism, which feeding mechanism is adapted to be driven from the cutting mechanism, and in either direction. The feeding mechanism further comprises an automatically adjustable compression roll associated with an endless feed conveyor, and adapted to be driven from said conveyor by an improved driving arrangement.

It is further sought to devise an improved cutting mechanism, wherein the movable cutter is carried by a vertically adjustable shaft having simple and efficient provision for effecting its adjustment, by the simple expedient of producing a vertical axial adjustment of said shaft.

Another feature of the invention is the provision of means whereby the speed of the feeding mechanism within the hopper or hoppers may be conveniently varied, according to the fineness with which the material is to be cut.

It is also sought to provide an improved apparatus of this character in which an efficient feeding action is effected between the cutting mechanism and the receiving passage of a blower whereby the material is discharged from the machine, in which connection an improvement is introduced into the discharge spout or conduit which takes the material from said blower, this latter feature comprising a universal swivel connection between the spout and blower casing for permitting the discharge of the material therethrough in any direction.

With the foregoing general objects in view, as well as minor objects as will appear in the course of the detailed description, the invention will now be described in detail in connection with the accompanying drawings illustrating one form of apparatus which we have devised for embodying the proposed improvements, after which those features deemed to be novel will be particularly set forth and claimed.

In the drawings—

Figures 1 and 2 are side and end elevations respectively, of an ensilage cutting apparatus constructed in accordance with the present invention;

Figure 3 is a plan view of the same, on a larger scale;

Figure 4 is a sectional elevation of the machine on the same scale as Figure 3, and representing an irregular vertical sectional view;

Figure 5 is an enlarged vertical sectional view, showing a portion of one of the hoppers and its feeding mechanism;

Figures 6 and 7 are horizontal and vertical sectional detail views, representing sections on the lines VI—VI and VII—VII respectively of Figure 5; and Figure 8 is a horizontal sectional view, representing a section on the line VIII—VIII of Figure 4.

Referring now to said drawings in detail, these show our improved machine as comprising main frame housing sections 10, 12, for enclosing the principal operating parts of the machine, and adapted to be secured together as by bolts 13 or the like and carried by any suitably arranged frame supporting members 14, 15, at the front and rear of the machine, respectively, where suitable supporting wheels 16 are provided, as well as appropriate draft connection 17 and steering connections 18, as shown in Figures 2 to 4. Preferably the frame parts 14, 15, are connected with the running gear by shock absorbing means, such as the plungers 20 and compression springs 22, as illustrated in Figure 4.

At the rear of the housing sections 10, 12, is carried a suitable blower casing 25, centrally of which is mounted a shaft 26 carrying a suitable blower fan 27 the blades 28 of which may be conveniently adjusted, for taking up end wear, by means of the securing bolts 29 and slots 29' (see Figure 4). At its outer end the shaft 26 is provided with an external drive pulley 30, and the inner end of the shaft is mounted in a bearing 31 and provided with a bevel gear 32 inside a gear casing 33, where said gear 32 meshes with another bevel gear 34 on the lower end of the vertical shaft 35, forming part of the cutting mechanism.

The interior of the housing section 10 is provided with two pairs of fixed bracket arms 37, each pair of which arms 37 carries a pivot bar 38 to provide a pivotal mounting for a knife supporting frame 39, as clearly illustrated in Figures 4 and 8. One end of each of the knife frames 39 is forked and has secured thereto one of the fixed cutter or shear bars 40, while the other end of each of the knife frames 39 is engaged on opposite sides by a pair of adjusting screws 41 carried by lugs 42 projecting from the interior of the housing section 10. By this means it is apparent that a certain degree of adjustment of the position of each of the cutter bars 40 may be obtained by appropriate adjustment of the screws 41.

For co-operating with the cutter bars 40, a set of knife bars 44 is carried by the shaft 35, each knife being mounted upon spacing blocks 45 carried by a horizontal disk 46 which is suitably secured to a block or collar 47 keyed to the lower end portion of the shaft 35. As represented in Figure 4, the lower end of the shaft 35 is slidingly keyed to the gear 34 to accommodate the vertical adjustment of said shaft, the upper end of which is provided with suitable bearings 49 mounted within a sleeve 50 which is fitted slidingly within the upper reduced housing portion 51 carried by the cap member 52 supported on the housing section 10. The upper end of the sleeve 50 is externally threaded for engagement and operation by the correspondingly threaded cap member 54, the latter being also formed with a flange 55 supported upon the flange 56 formed on the upper end of the housing 51, and secured thereto by means of the bolts 57 passing through notches or recesses 58 in the flange 55. By means of this construction and arrangement, it is obvious that the shaft 35 and knives carried thereby may be conveniently adjusted by removing the bolts 57 and rotating the cap 54 for either lowering or raising the sleeve 50, after which the bolts 57 may be replaced in position, the series of notches or recesses 58 accommodating these different positions of the cap member 54.

At opposite sides of the machine are carried suitable upright hoppers 60, the lower portions of which project through suitable openings provided in the upper housing portion 10, and on opposite sides of the cap plate 52. Referring now more particularly to Figures 5 to 7, these illustrate the feeding means which we have devised for assisting the action of gravity in causing the material to be fed to the cutting mechanism, the arrangement being such that each hopper is adapted to discharge its material directly in front of one of the fixed cutter bars or knives 40. Each feeding device comprises an endless conveyor made up of a pair of endless chains 62 connected by conveyor flights 63 of angle bar material and having the toothed edges as indicated at 64 for effective feeding engagement with the material. At the upper end of each conveyor the chains 62 are carried around idler sprocket wheels 65, and at the lower or discharge end of the conveyor the chains 62 are carried around sprocket teeth 66 provided at the opposite ends of a feed drum 67 mounted on a shaft 68, the purpose of said drum being to reinforce the conveyor flights 63 at this point, as the material is compressed between the feed drum 67 and the compression drum hereinafter referred to.

One end of each of the shafts 68 projects into a gear compartment provided in the housing 10 outside the corresponding hopper, to which compartment access may be had by a suitable door 70 (see Figure 1). This end of said shaft 68 is provided with a gear 72 which meshes with a pinion 73 mounted on one end of a shaft 74 projecting entirely across the corresponding hopper, at the other side of which said shaft 74 is received within a gear case 75; this end of the shaft 74 is provided with a bevel gear 76 the opposite sides of which are meshed with a pair of bevel pinions 77, 78 loosely journaled upon an upright shaft 79 carried by the gear case 75 (see Figure 7). Keyed to the shaft 79 between the pinions 77 and 78 and adapted to be engaged with either of said pinions is a sliding clutch element 80 for which is provided a clutch fork 81 carried by the inner end of a shaft 82, the shaft 82 at the front of the machine being provided with a suitable operating lever 83 as shown in Figure 4. The other end of the shaft 82 at the rear of the machine is provided with an arm 84, and the latter connected by a link 85 with an operating lever 86 at the side of the machine, as shown in Figure 3.

As shown in Figures 4 and 7, a gear wheel 88 is keyed to the upper end of each of the shafts 79, and these gear wheels 88 are slidingly meshed with a spur pinion 90 which is keyed to the upper end portion of the cutter shaft 35. By this means it will be seen that the endless conveyor devices are driven from the cutter shaft, and these conveyors are operated in a direction for feeding the material to the cutting mechanism whenever the clutch element 80 of each conveyor drive is meshed with the upper bevel pinion 77, whereas each conveyor is driven in the opposite or reverse direction when said clutch elements 80 are moved into engagement with the lower bevel pinions 78, as will be readily understood. The sliding relation between the spur pinion 90 and the gear wheels 88 is provided in order to maintain this drive relation constant regardless of the adjustments to which the cutter shaft 35 may be subjected.

The gears 72 and pinions 73 are both removable from the corresponding shafts, access being had thereto by way of the doors 70, this being for the purpose of allowing gears and pinions of a different ratio to be applied to the shafts 68 and 74, as may be required for imparting a different rate of feeding movement to the conveyors, according to the degree of fineness with which the material is being cut by the cutting mechanism.

Adjacent to each of the feed rolls 67 is mounted a compression drum 95, each having the toothed angle bars 96 similar to the conveyor flights 63, and each drum 95 being carried by a transverse shaft 97 journaled in bearing blocks 98 which are slidingly mounted in guideways 99, where each block 98 is actuated by a coil compresison spring 100 for the purpose of yieldingly actuating the compression drum 95, with a given pressure, normally in the direction of the feed roll 67. For accommodating this movement guide slots 101 are provided for the opposite end portions of the shaft 97, the action of the springs 100 being to maintain the said shaft 97 normally at one end of said slots 101, that is, the end nearest the feed roll 67 (see Figure 6).

Referring to Figures 6 and 7, each shaft 97 is connected by a suitable flexible coupling, indicated by the reference numeral 102, with an extension 97' carrying a sprocket wheel 103 which is connected by a chain 104 with a sprocket wheel 105, the latter being keyed to a short shaft 106, these parts being all within the gear compartment at the rear of the door 70. Also keyed to shaft 106 is a gear wheel 107 meshing with a gear wheel 108 which is keyed to the shaft 68 carrying the feed roll 67. By this means it is apparent that the operation of the shaft 68 will serve to rotate the shaft 97 and the feed compression drum 95 carried thereby, in a direction for feeding the material downward between said feed drums, and that the compression springs 100 will yieldingly actuate the drum 95 in the direction of the drum 67, and automatically yield or retract to permit uneven quantities of the material to pass between the drums.

To compensate for this backing up movement of the compression drum 95, the form of drive connection just described is provided, and for maintaining the proper drive relations constant between the gears and sprocket wheels we provide a connecting rod 110 pivotally connecting the shaft extension 97' and the shaft 106, and a corresponding connecting rod 111 connecting the shafts 106 and 68, as clearly shown in Figure 6.

As illustrated in Figure 4, the bottom of the housing section 12 is inclined beneath the cutting mechanism in the direction of the receiving opening 115 of the lower casing 25, thus facilitating the passage of the cut material to the interior of the blower, where it is discharged by the action of the fan 27 into the discharge spout or conduit pipe 117. This spout or pipe 117 is provided with a ball and socket connection 118 with the outlet portion of the blower casing 25, thus providing a universal pivotal support for the discharge spout and permitting the latter to be swung from the vertical in any direction, as may be preferred.

From the foregoing it will be seen that we have devised a practical and efficient arrangement and construction for carrying out all the desired objects of the invention. A more efficient feeding arrangement is provided by the mounting of the hoppers directly above the cutting mechanism, due to the action of gravity in tending to produce a natural flow of the material directly into the path of the cutting devices. The arrangement is furthermore such that the hoppers may be both operated simultaneously, or either of them operated singly independent of the other, according to requirements. The drive from the cutting mechanism to the feeding mechanisms may readily be reversed by shifting the clutch elements 80, in the event of either of the feeding mechanisms being clogged or choked, this backward movement readily relieving any congestion between the feed drums. The cutting mechanism may be adjusted either by means of the screws 41 or by the adjustment of the cutter shaft 35 through the medium of the adjusting cap member 54, and without disturbing the drive to the feeding mechanism. As already indicated, the rate of feeding movement may be varied by simply changing the gears on the shafts 68 and 74, to suit the character of the cutting operations. As fast as the material is cut, it is conducted through the inclined passage leading to the receiving opening 115 of the blower, and thereby discharged through the discharge spout or conduit 117 to any desired point.

While we have illustrated and described what we now regard as the most practical and efficient form of embodiment of our improvements, we desire to reserve the right to make all such changes or modifications as may fairly fall within the scope of the appended claims.

What we claim is:

1. An ensilage cutting machine comprising cutting mechanism including a rotating shaft carrying a cutting knife, a fixed cutter or shear bar mounted in position for co-operating with said knife, a frame carrying said shear bar and rocking about a fixed axis at right angles to said shaft, and means for tilting said frame to vary the position of said shear bar relative to the path of movement of said knife.

2. An ensilage cutting machine comprising cutting mechanism including a fixed cutter or shear bar, a frame carrying said shear bar and rocking about a fixed axis, and adjustable means engaging said frame and operative to tilt the same into different angular positions for varying the operative angle of said shear bar.

3. An ensilage cutting machine comprising cutting mechanism including a pair of horizontally arranged and normally fixed cutter bars, a vertical shaft mounted between said cutter bars and carrying knives adapted, during rotation of the shaft, to co-operate with said cutter bars, means for rotating said shaft, and an independent feed hopper mounted in vertically upright position for feeding by gravity to each of said fixed cutter bars.

4. An ensilage cutting machine comprising a vertically upright feed hopper, cutting mechanism including a normally fixed cutter bar arranged horizontally at the base of said hopper, a vertical shaft carrying a knife adapted as said shaft is rotated to co-operate with said cutter bar, means for rotating said shaft, means for vertically adjusting said shaft to vary the operative relation of said knife and cutter bar, and means operable to effect a still further adjustment of said fixed cutter bar relative to the path of movement of said knife.

In witness whereof we hereunto affix our signatures.

HARRY L. WHITNEY.
HARRY A. LYON.